United States Patent [19]

Hoffman

[11] Patent Number: 4,696,112

[45] Date of Patent: Sep. 29, 1987

[54] BORE HOLE NAVIGATOR

[75] Inventor: George J. Hoffman, Malibu, Calif.

[73] Assignee: Condor Pacific Industries, Inc., Canoga Park, Calif.

[21] Appl. No.: 903,608

[22] Filed: Sep. 5, 1986

[51] Int. Cl.$^4$ ............... G01C 19/16; E21B 47/022
[52] U.S. Cl. ......................................... 33/304; 33/312
[58] Field of Search ............... 33/304, 312, 313, 318

[56] References Cited

U.S. PATENT DOCUMENTS

| | | | |
|---|---|---|---|
| 4,197,654 | 4/1980 | Van Steenwyk et al. | 33/304 |
| 4,238,889 | 12/1980 | Barriac | 33/312 |
| 4,244,116 | 1/1981 | Barriac | 33/304 |
| 4,245,498 | 1/1981 | Poquette, Jr. | 33/313 |

FOREIGN PATENT DOCUMENTS 2103793  2/1983  United Kingdom .................. 33/304

*Primary Examiner*—Richard R. Stearns
*Attorney, Agent, or Firm*—Blakely, Sokoloff, Taylor & Zafman

[57] ABSTRACT

A bore hole navigator utilizing a two axis directional gyro on the inner frame of the navigator and a single axis accelerometer on the outer frame is disclosed. This allows the inner frame of the navigator and thus the entire navigator to be smaller in diameter, both because of the removal of the acceleration axis to the outer gimbal and because the electrolytic level sensor, if used, is much smaller than a single axis accelerometer. The overall smaller diameter is maintained by using a belted design wherein the gyro/electrolytic level sensor, the inner frame torquer/gear and the inner frame resolver are connected in series along the length of the navigator, with a high gear reduction ratio on the inner frame torquer providing a positive drive within a smaller diameter. This configuration, together with unique calculation algorithms allows smaller diameter and deeper holes to be surveyed.

6 Claims, 5 Drawing Figures

BOREHOLE NAVIGATOR PROBE 1/2
PLATFORM AND ANALOG ELECTRONICS

BORE HOLE NAVIGATOR

BACKGROUND OF THE INVENTION

1. Field of the Invention

The present invention relates to the field of bore hole surveying

2. Prior Art.

In the drilling for gas and oil it is generally desired to know the trajectory of the drill string for various reasons. Ideally it would be desirable to be able to monitor and plot the path of the drilling as drilling progresses. However, the extreme environment and other factors generally prevent this, with the result that normally the drill string is pulled periodically and appropriate sensors put down the hole to take the required readings from which the drill string trajectory can be determined. See for instance U.S. Pat. Nos. 2,635,349; 3,384,750; 3,753,296; 3,896,412; and 4,071,959. While the nature of the instrumentation lowered into the hole and the concept of operation thereof varies widely, it is common to measure as one reading the length of cable let out as one of the primary data inputs while other readings are simultaneously being taken.

Such a system is also shown in U.S. Pat. No. 4,238,889. That patent discloses a system having a two axis gyro and a two axis accelerometer mounted on the inner frame of a two axis platform. While the system of that patent utilizes a belt drive to couple the inner frame with its associated angular position sensor and torquer so as to space the angular position sensor and torquer at different axial positions along the bore hole, the two axis gyro together with the two axis accelerometer are all mounted coaxially, with the result that the overall assembly in accordance with that patent is still considerably larger than that of the present invention.

BRIEF SUMMARY OF THE INVENTION

A bore hole navigator utilizing a two axis directional gyro on the inner frame of the navigator and a single axis accelerometer on the outer frame is disclosed. This allows the inner frame of the navigator and thus the entire navigator to be smaller in diameter, both because of the removal of the acceleration axis to the outer gimbal and because the optional electrolytic level sensor, if used, is much smaller than a single axis accelerometer. The overall smaller diameter is maintained by using a belted design wherein the gyro/electrolytic level sensor, the inner frame torquer/gear and the inner frame resolver are connected in series along the length of the navigator, with a high gear reduction ratio on the inner frame torquer providing a positive drive within a smaller diameter. This configuration, together with unique calculation algorithms allows smaller diameter and deeper holes to be surveyed.

DETAILED DESCRIPTION OF THE INVENTION

A complete system in accordance with the present invention is comprised of a number of subsystems to facilitate the operation of data gathering and data reduction functions of the system. In addition to the inertial platform which is lowered down the hole, the down hole portion of the system also includes certain analog electronics as well as digital electronics, including a microprocessor based system with data transmission capabilities for communication with the up hole portion of the system. Physical details of the electronics need not be given herein, as current technology readily facilitates the packaging of analog and digital electronics within a relatively small diameter package, and thus the electronics is not a limiting factor when attempting to build an inertial navigating system of minimum diameter for down hole surveying. The up hole portion of the system, aside from the cable length measuring system, includes an appropriate computer, communication electronics for the computer to communicate with the down hole electronics, and an appropriate power supply.

Figures 1, 5:
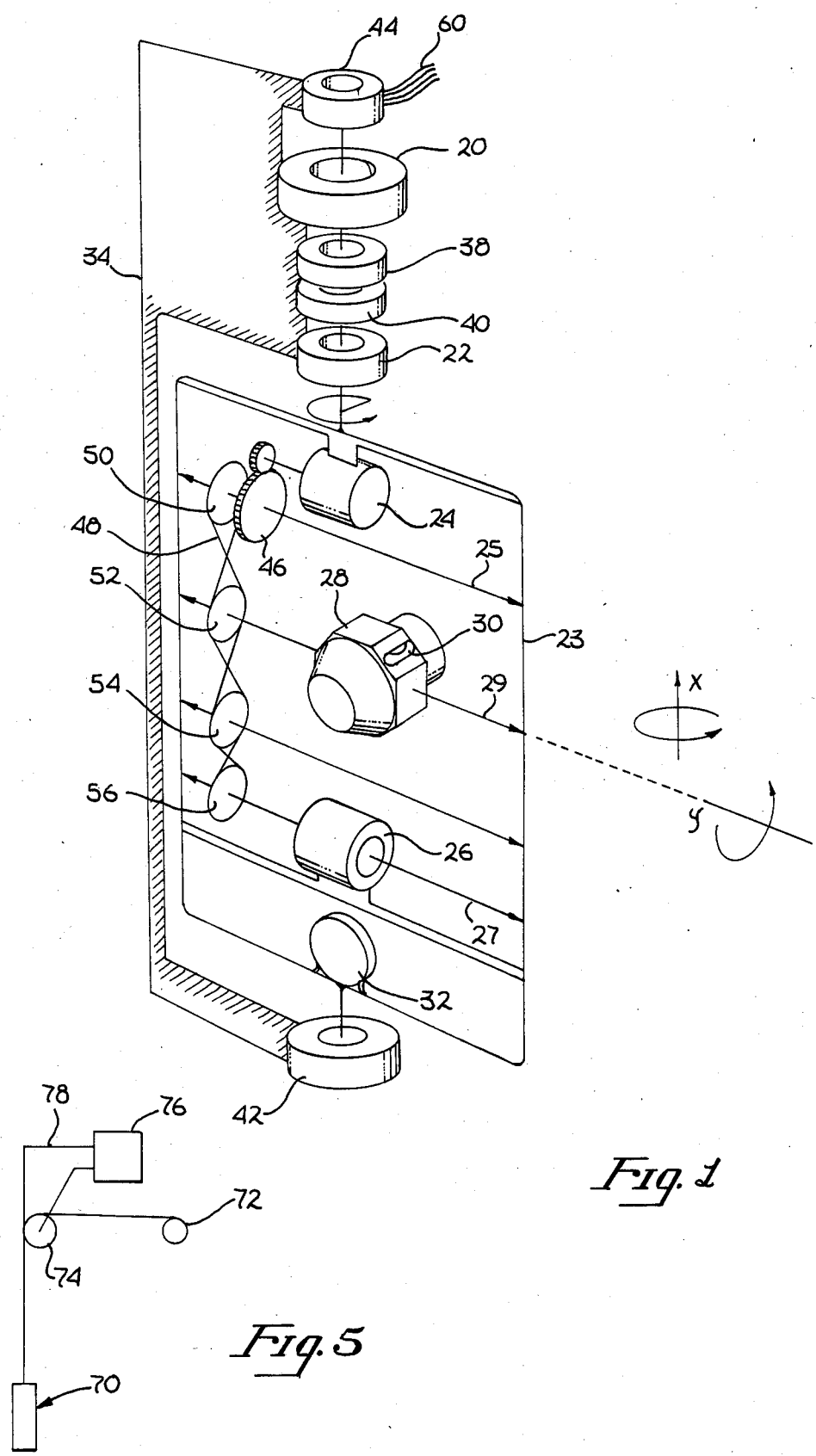
FIG. 1 is a schematic illustration of the bore hole navigator of the present invention.
FIG. 5 is the schematic illustration of the cable length measuring system.

First referring to FIG. 1, it may be seen that the platform consists of an outer frame having an outer gimbal or frame axis aligned with the axis of the outer enclosure (and with the bore hole itself), and an "inner gimbal" assembly with the various elements thereof being positioned on one of three spaced apart inner gimbal axes, the axes being spaced apart along the outer gimbal axis to minimize the diametral requirements of the platform. The outer gimbal is bearing supported at each end to define the yaw axis of the platform, and includes a yaw resolver 20 for measuring the angle between the case of the platform and the outer gimbal thereof, and a yaw torquer 22 to provide a controllable torque about the outer gimbal axis. With respect to the inner gimbal, the various elements on the three parallel inner gimbal axes are belted together, as shall subsequently be seen in detail, so as to rotate in unison. On the upper inner gimbal axis segment 25 is a pitch torquer 24, with a pitch resolver 26 on the lower inner gimbal axis segment 27 for measuring the rotation of the three pitch axis segments. On the center inner gimbal axis segment 29 is a two axis gyro 28 having the Z or spin axis thereof orthogonal to the respective inner gimbal axis segment. Also mounted on the gyro case is an electrolytic bubble level 30 sensitive to rotations about the inner gimbal axis and aligned to sense when the gyro spin axis is level. Finally, mounted to the outer gimbal adjacent the lower end thereof is a single axis accelerometer 32 aligned with its sensitive axis orthogonal to both the outer gimbal axis and the inner gimbal axis segments.

The entire assembly of FIG. 1 is of course sealed within a cylindrical enclosure having an appropriate connector at the top end thereof for connection to an analog electronics package thereabove. The analog electronics in turn are connected to a digital electronics package thereabove which, among other things, handles communication on an appropriate cable to the equipment topside (See FIGS. 2 through 4).

The platform outer gimble assembly is supported adjacent the top thereof on ball bearings 38 and 40, and adjacent the bottom thereof by ball bearings 42, the ball bearings 38, 40 and 42 being coupled to frame 34. In that regard, the upper end of the outer gimbal assembly, extends through the upper bearings 38 and 40 to cooperate with a slip ring assembly 44 for bringing electrical signals and power into and out of the platform. Between the slip ring assembly 44 and bearing 38 is the yaw or outer gimbal resolver 20. Located below the assembly of bearings 38 and 40 is the yaw torquer 22 operative to controllably torque the entire outer gimbal assembly 23 about the axis of bearings 38, 40 and 42.

Located still therebelow along the axis of the platform assembly is the pitch torquer 24, the pitch torquer actually comprising a motor mounted above the inner gimbal axis segment 25 and operating against gear 46 on axis 25, thereby providing a substantial torque about that axis for suitably driving components mounted on the additional inner gimbal axis segment therebelow.

Mounted below axis 25 and rotatable with respect to the outer gimbal axis about an axis segment parallel to axis 25 is the two axis gyro 28 having pickoffs and torquers on each of the two primary axes orthogonal to the spin axis, one of which (the Y axis) is aligned with the platform inner gimbal axis. The gyro of course also has fastened thereto the bubble 30 used for initially leveling the gyro as described hereinafter. Located still below gyro 28 on axis 27 is the pitch resolver 26. Torquer 24 in this assembly is coupled to the gyro 28 and to the pitch resolver 26 through a wire drive 48 coupling drums 50, 52, 54 and 56, drum 54 being on an idler shaft in the assembly shown. The wire, being taught yet highly flexible, provides the desired coupling between the pitch torquer 24, the gyro 28 and the pitch resolver 26, so that these three components will rotate in unison (neglecting any differences in the direction of rotation thereof, as in general polarities may be reversed to accommodate differences in rotational direction). Finally of course accelerometer 32 is mounted directly to the outer gimbal assembly adjacent the lower end thereof.

Figure 2:
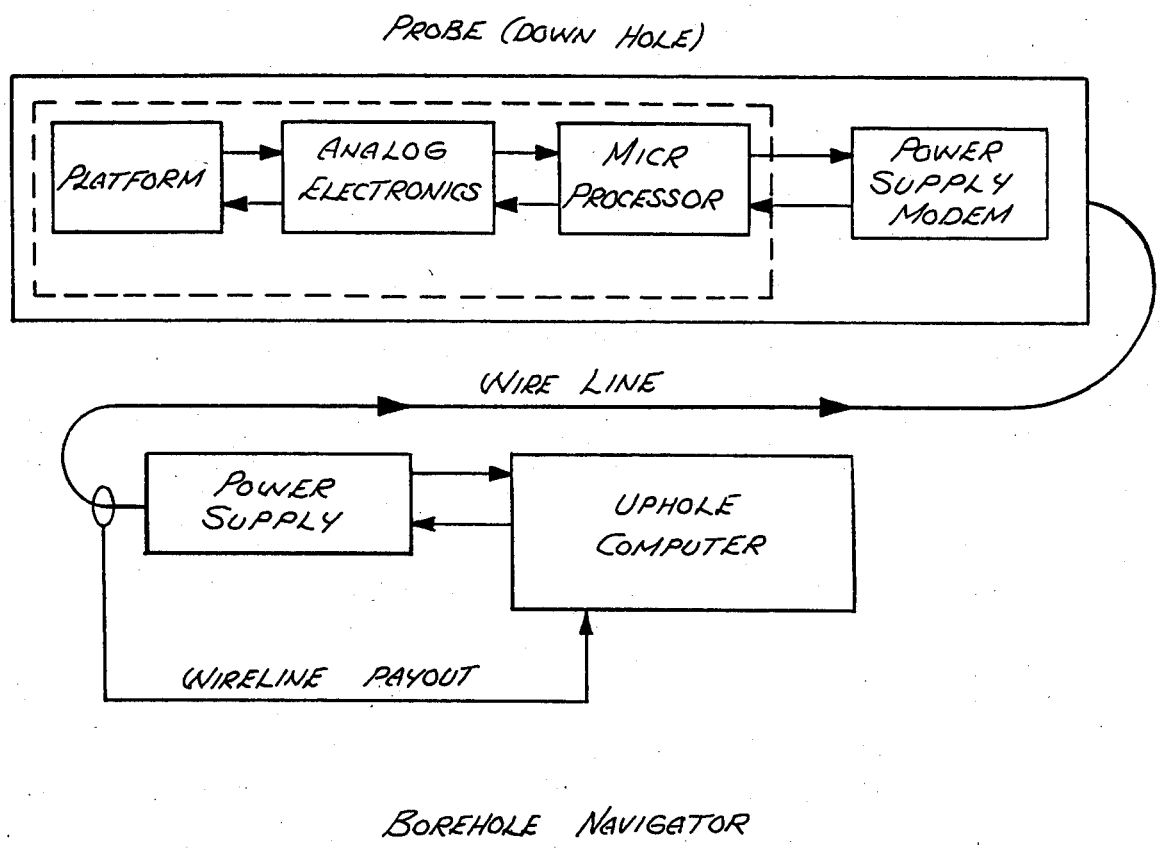
FIG. 2 is a block diagram of the overall system.

It may be seen from the figure that the component that limits the diameter of the platform is the gyro 28 itself, as the wire 48 coupling system, flexible cable 58, etc., require very little increase in diameter of the system over that required for the gyro alone. This is to be compared with the system disclosed in U.S. Pat. No. 4,238,889 wherein the equivalent portion of the diameter of the overall system as shown in FIG. 2 thereof includes not only the gyro as supported on the outer gimbal, but also the accelerometer and additional circuitry. Consequently the gyro diameter in the present invention is to be compared to the coaxial arrangement of the gyro, two axis accelerometer and additional circuit complexity of the '889 patent. Accordingly, the platform of the present invention allows for a substantial reduction in the diameter of the overall platform assembly without sacrifice of accuracy, thereby allowing the use of the present invention in smaller and deeper bore holes.

Figure 3:
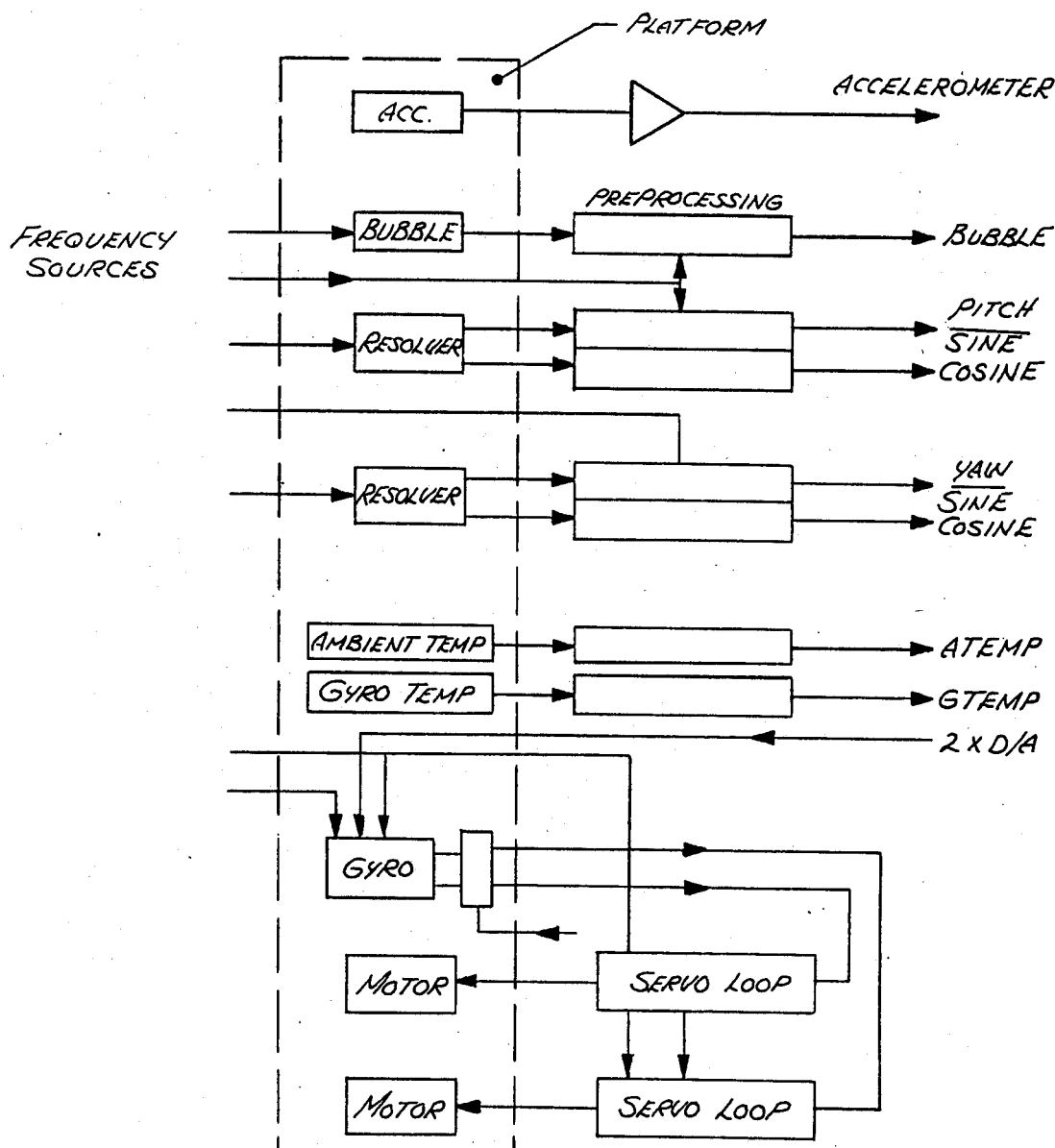
FIG. 3 is a block diagram of the borehole navigator probe platform and analog electronics.
Figure 4:
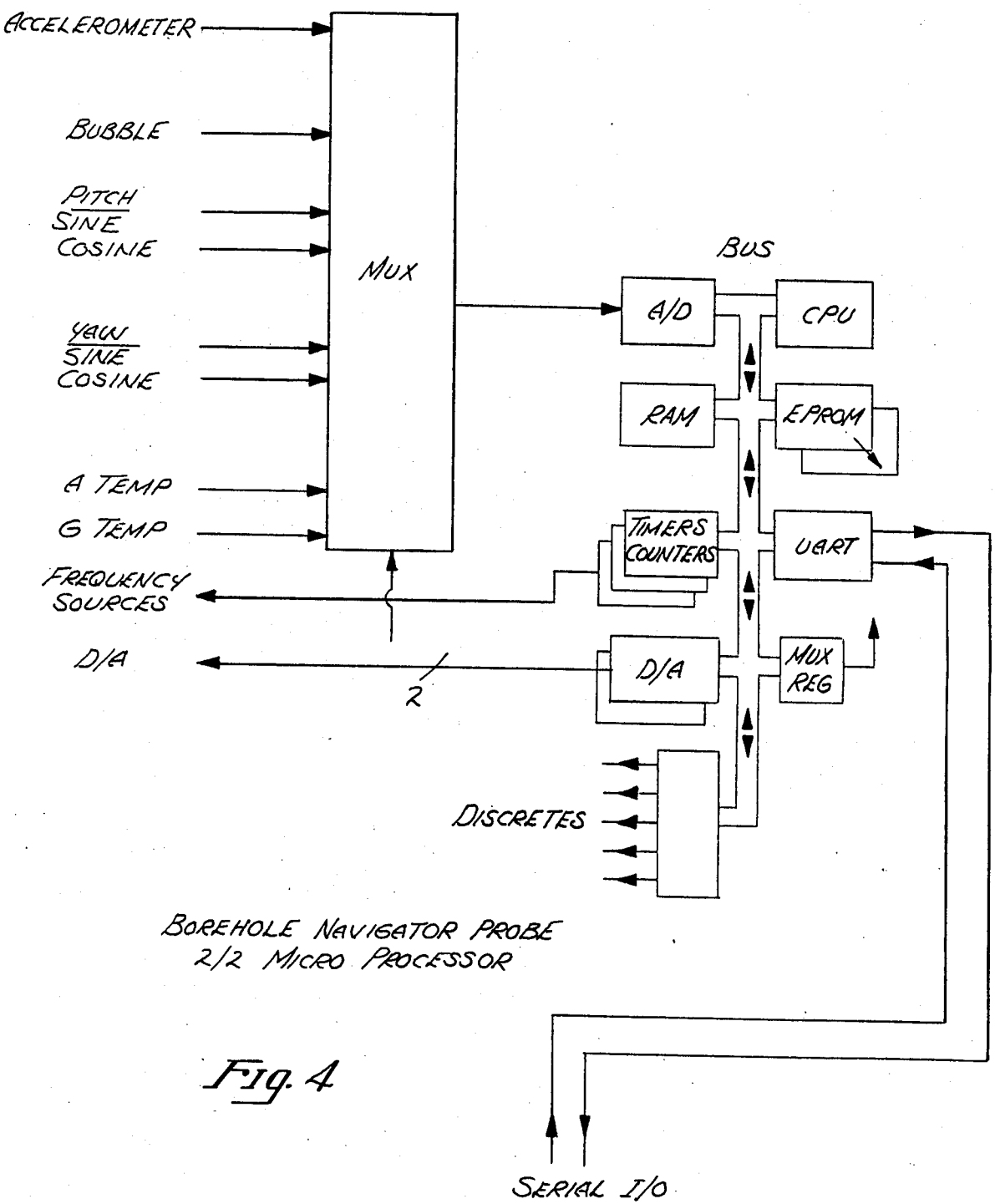
FIG. 4 is a block diagram of the borehole navigator probe microprocessor and associated digital electronics.

Now referring to FIGS. 2 through 4, block diagrams showing the platform and associated electronics therefor may be seen. FIG. 2 is a block diagram of the overall system, with FIGS. 3 and 4 being block diagrams of the platform and analog and digital electronics.

The platform has two primary operating modes, specifically, an alignment mode and a navigation mode. The alignment procedure is based upon the fact that when the gyro Y axis points exactly EAST or WEST (e.g. the spin is exactly NORTH), there is no input rate (earth rate) on that axis and the bubble output will be constant (assuming an ideal gyro). If the spin axis is not exactly NORTH the bubble will sense a drift of OMEGA * COS (LAMBDA) * SIN (PSI) where: OMEGA is the earth rate, approximately 15 degrees/H, LAMBDA is latitude, positive in the northern hemisphere, and PSI is the misalignment angle from NORTH.

Since the gyro is not ideal its own uncompensated drift must be cancelled out. This is accomplished by a "two step gyro compassing" scheme: A drift measurement is taken near SOUTH (e.g. spin pointing SOUTH) and a second drift measurement is taken near NORTH. Both measurements are taken with the spin axis level. The results of the 2 measurements permit the determination of the fixed gyro bias versus earth rate. The change in gyro drift and the misalignment angle are calculated using DRYS and DRYN. If the misalignment is too large a second iteration is executed.

The drift measurement (Y axis) consists of trying to keep the bubble output at zero and measuring the required torque (DRY).

For the navigation mode, the navigation gyro loops are closed by the computer, and navigation equations by the up hole computer. The outputs sent to the up hole computer are:

Built in Test
Accelerometer
Pitch Resolver

The up hole computer also uses the cable length (depth measured along the well). The navigation formulas are:

AZ = ARCTAN (SIN (PHI)/TAN (P)) ·
Inclination = ARCTAN (SQR (TAN$^2$ (PHI) + TAN$^2$ (P)/COS$^2$ (PHI))

where:
PHI—accelerometer output
P—Pitch, resolver output
If BH is the platform casing vector (axis) then:
  INCLINATION is the angle between the BH vector and the local vertical.
  AZ—AZIMUTH, is the angle between the horizontal component of BH and NORTH.

In the navigation formulas to follow, ΔL is the corrected cable payout during the last time cycle - "Δt" (cycle period preferably should be less than 3 sec). Cable payout is measured as illustrated schematically in FIG. 5, wherein the cable supporting the downhole assembly, generally indicated by the numeral 70, as controlled by winch 72, is measured by a roller assembly 74 to provide a signal to the computer 76 used in conjunction with data from the downhole system received on cable 78. ΔL could also come from a magnetic detector which provides a pulse whenever the downhole assembly passes a collar. Such a signal may be used to replace or compliment the cable payout measurement as desired. In any event, if the actual cable payout measurement is used, the present invention includes a downhole temperature sensor which allows the computer to accumulate a temperature profile which can be used for correction of the cable length measurements.

The continuous formulas are:

$$\text{Depth} = \int_0^T \Delta L/\Delta t * \text{COS (INCLINATION)} \, dt$$

$$\text{North} = \int_0^T \Delta L/\Delta t * \text{SIN (INCLINATION) cos} (AZ) \, dt$$

$$\text{East} = \int_0^T \Delta L/\Delta t * \text{SIN (INCLINATION) SIN } (AZ) \, dt$$

Depth, North, East are the respective deviations in depth., northing and easting from the up hole starting point.

The iterations are made on a discrete basis once every Δt sec. The formulas are:

AVINCLIN = (Inclination Last + Inclination Pres.)/2

AV AZ = (AZ Last + AZ Present)/2

These two average angles define approximately the direction of ΔL.

Depth = ΣΔL * COS (AVINCLIN)

North = ΣΔL * SIN (AVINCLIN) COS AV AZ

East + ΣΔL * SIN (AVINCLIN) SIN AV AZ

The initial leveling of the gyro spin axis prior to lowering the bore hole navigator into the bore hole may be implemented by having the navigator case mounted in a vertical fixture and bringing the inner frame resolver to zero. Preferably however, the electrolytic level sensor or bubble (shown in FIGS. 1 and 3) may be used. When this is done the preferre algorithm compensates for the gyro run to run bias changes in the pitch gyro axis by making two measurements of different yaw resolver angles and averaging those readings.

Bore holes frequently deviate substantially from vertical, sometimes by an amount approaching or even exceeding 90 degrees. To preserve navigation accuracy in such instances, the present invention utilizes a unique algorithm to accommodate such an occurrence. In particular, if while lowering the navigator down the bore hole the bore hole reaches an inclination larger than a predetermined angle, typically somewhere between 45 and 90 degrees, the gyro pitch torquer is torqued another beta angle in such a way as to decrease the angle between the inner and outer frames (gimbals) of the gyro. This may be done as the descent continues, though it may be preferable to stop the descent to accomplish the full torqueing at one bore hole depth. From this time on the angle beta is taken into account in the navigation equations. Of course depending upon the subsequent bore hole trajectory, one may reverse this procedure at some point and thereafter stop taking the angle beta into account in the data reduction.

Finally, one may make a tool face measurement by recognizing that the system can measure true heading. In particular by using the information from the two resolvers and the accelerometer one may define the true heading of the instrument:

HEADING = ARCTAN [SIN (Y)* COS (R) − TAN (P)* SIN (R)]

where:
Y—yaw resolver measurement
P—pitch resolver
R—accelerometer

There has been described herein a new and unique bore hole navigator having a number of advantages over prior art navigators. The navigator described has an inner gimbal which is smaller in diameter than prior art navigators, both because of the removal of the accelerometer to the outer gimbal and because the electrolytic level sensor, if used, is much smaller than even a single axis accelerometer. The system is also less expensive in that the single axis accelerometer on the outer gimbal is less expensive and requires less signal coupling and signal processing than a two axis accelerometer on the inner gimbal. This of course is also reflected in the required number of lines in the flexible connection between the inner frame and the outer frame, a highly desirable end result. Because of these various reductions, the entire system requires less power than prior art systems, an important advantage since power is transmitted from up hole over distances of up to 20,000 feet. Of course while the present invention has been disclosed and described herein with respect to a preferred embodiment thereof, it will be understood by those skilled in the art that various changes in form and detail may be made therein without departing from the spirit and scope thereof.

I claim:

1. A bore hole navigator comprising a two axis platform for lowering down a bore hole on a cable with its longitudinal axis parallel to the local bore hole direction, said two axis platform having an outer gimbal, bearing supported on the outer gimbal axis for rotation about the longitudinal axis of said platform, and an inner gimbal axis orthogonal to said outer gimbal axis, said inner gimbal axis having multiple axis segments spaced along the longitudinal axis of said platform and each bearing supported on said outer gimbal, a first said inner gimbal axis segment having a two axis gyro mounted thereon with its spin axis orthogonal to the respective inner gimbal axis segment, a first gyro sensitive axis parallel to the respective inner gimbal axis segment and a second gyro sensitive axis orthogonal to the spin axis and the first gyro sensitive axis, a second said inner gimbal axis segment having a pitch torquer thereon operative to provide a controllable torque about the respective inner gimbal axis segment, a third said inner gimbal axis segment having a pitch resolver thereon operative to measure rotation of the respective inner gimbal axis segment with respect to said outer gimbal, said first, second and third inner gimbal axis segments being coupled to rotate together, said outer gimbal having a yaw torquer thereon to provide a controllable torque about the outer gimbal axis, and a yaw resolver thereon to measure rotation of the outer gimbal about the outer gimbal axis, said outer gimbal also having a single axis accelerometer therein having its sensitive axis orthogonal to said outer gimbal axis and said inner gimbal axis segments.

2. The bore hole navigator of claim 1 wherein said inner gimbal torquer includes a substantial gear reduction to reduce the speed and increase the torque thereof of said inner gimbal torquer.

3. The bore hole navigator of claim 1 wherein said multiple gimbal axis segments are coupled together to rotate together through a wire drive.

4. The bore hole navigator of claim 1 further comprised of a bubble level disposed to indicate when the gyro spin axis is level.

5. The bore hole navigator of claim 1 further comprised of means for measuring cable length.

6. The bore hole navigator of claim 5 further including sensing means for lowering down the bore hole with said platform for measuring the bore hole temperature profile and correcting the cable length as measured by said means for measuring cable length.

* * * * *